May 28, 1929.  H. CHRISMAN  1,715,117
PEN
Filed Oct. 22, 1925
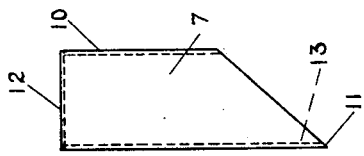
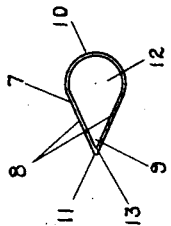
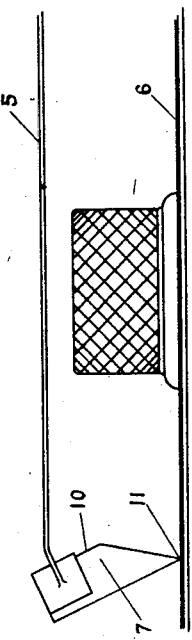
INVENTOR
Horace Chrisman
By Green and McCallister
His Attorneys Patented May 28, 1929.

1,715,117

UNITED STATES PATENT OFFICE.

HORACE CHRISMAN, OF EDGEWOOD, PENNSYLVANIA, ASSIGNOR, BY MESNE ASSIGNMENTS, OF PITTSBURGH, EQUITABLE METER COMPANY, OF PITTSBURGH, PENNSYLVANIA, A CORPORATION OF PENNSYLVANIA.

PEN.

Application filed October 22, 1925. Serial No. 64,138.

This invention relates to pens and more particularly to pens used in connection with marking the charts of recording meters and the like.

Pens of this type are now formed by shaping a flat strip into a more or less V-shape form so as to provide an open trough-like member which is so held by a suitable mechanism that ink or other writing fluid placed therein will slowly flow out of the trough and mark a chart or the like with which the point of the trough or pen contacts.

In view of the fact that an extended surface of the ink in this form of pen is exposed directly to the atmosphere there is an objectionably rapid evaporation thereof with the consequent necessity of frequently refilling the pen. In addition, dirt is easily deposited from the atmosphere and rapidly collects in the trough of the pen so as to require constant cleaning to insure an easy flow of the ink during the operation of the pen. This type of pen is also relatively expensive to manufacture, due to the fact that it necessitates the shaping of a flat strip of material and requires several operations before the pen is completed.

An object of this invention is to provide a pen for recording meters of such construction and arrangement that the ink in the pen is more effectively protected from the atmosphere than in the usual form of pen, so as to avoid to a great extent the deposit of dirt and foreign substances in the ink and also to materially reduce the evaporation of the ink.

A further object is to provide a pen of the type set forth which has a more rigid construction than pens now in use so that it is less likely to be accidently distorted, thus increasing the accuracy of the charts obtained by its use.

A still further object is to provide a pen of the type set forth which is simpler and therefore substantially cheaper to manufacture than the pens now used for the purpose specified.

These and other objects which will be apparent to those skilled in this particular art are accomplished by means of the invention illustrated in the accompanying drawing, in which Figure 1 is a view in elevation of a pen constructed in accordance with the now preferred embodiment of this invention, showing the same mounted in operative relation to the chart of a recording meter. Fig. 2 is a similar view on an enlarged scale of the pen shown in Fig. 1 and Fig. 3 is an end view thereof.

The particular embodiment of this invention which has been chosen for the purposes of illustration is shown as mounted in a pen supporting arm 5 in operative relation to a recording chart 6.

The pen forming the subject matter of this invention consists of a tubular body member 7 which is bent as shown in Fig. 3 to provide wings 8 extending at an acute angle to each other so as to form an ink well or reservoir in the shape of a trough 9. The side of the tube opposite the trough then constitutes a cover 10 for the interior of the body portion extending from one wing to the other and integral therewith.

The body portion is cut at an acute angle to its axis so as to provide a writing point 11 at one end of the ink well or trough 9. The opposite end of the body is closed by a closure 12 which cooperates with the cover 10 in enclosing the interior of the pen and protecting the ink against dirt and rapid evaporation and also in preventing the ink from flowing out of the pen at any place but the point 11.

The bottom of the trough or well 9 forms or constitutes a capillary groove 13 to assist the capillary flow of ink along the pen.

Pens made from tubular material are substantially cheaper to manufacture for the reason that the step of forming or shaping a flat blank, necessary in making the well known open trough pen, is entirely eliminated. Tubular material can be drawn or otherwise formed to the shape desired at the time of manufacture without any additional expense.

The cover portion 10 and the closure 12 cooperate to protect the interior of the pen and ink from dirt and foreign substances in the atmosphere and the provision of a practically closed chamber or well for the ink effectively reduces evaporation and permits the pen to be positioned with the writing point at the upper end of the trough when the capillary action of the groove 13 will provide a flow of ink to such elevated point. The cover 10 uniting the wings 8 constitutes a stiffening member which adds substantially to the rigidity of the structure so that it is less likely to be accidently distorted, resulting in increased accuracy and longer life than has hitherto been possible and the closure 12, sealing as it does the back end of the tubular chamber, provides a reservoir for the ink which will prevent accidental discharge since, when the reservoir is full of ink, atmospheric pressure plus surface tension will prevent any gravity flow from the reservoir. At the same time the pen can be filled and cleaned as easily and quickly as the common open trough form.

The pen is preferably made from a non-corrosive substance such, for example, as silver, nickel silver, etc.

What I claim as new and desire to secure by Letters Patent is:

1. A pen for recording meters including a tubular body member designed to be supported in inclined position during its operation and to form a trough having substantially flat sides, a capillary groove formed along the joint between said sides and extending longitudinally of said member, a writing point formed at one end of the groove in said body member, and positioned so as to be supplied with ink flowing lengthwise of said groove by capillary action, said tubular body member being bent between said sides to form a cover integrally connecting the sides of said trough and a closure for the end of said body member opposite said point and co-operating with said cover to enclose the interior of said trough.

2. A pen for recording meters including an elongated tubular body member bent to form a trough having flat sides converging toward a line to form a capillary groove along the joint between said sides and extending longitudinally of said member, a writing point formed at one end of the groove in said body member and provided with an opening registering with said groove so that ink will flow lengthwise of said groove to said point, said tubular body member being bent between said sides to form a cover integrally connecting said sides and closing said trough, and a closure for the ends of said body member, the closure for the end adjacent said point being disposed at an acute angle to said groove to provide a body having a relatively sharp point.

In testimony whereof, I have hereunto subscribed my name this 19th day of October, 1925.

HORACE CHRISMAN.